United States Patent
Tuma

(10) Patent No.: US 8,776,832 B2
(45) Date of Patent: Jul. 15, 2014

(54) VALVE FOR ELECTRONIC ENCLOSURE

(75) Inventor: Daniel L. Tuma, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 108 days.

(21) Appl. No.: 13/316,269

(22) Filed: Dec. 9, 2011

(65) Prior Publication Data

US 2012/0145940 A1 Jun. 14, 2012

Related U.S. Application Data

(60) Provisional application No. 61/421,536, filed on Dec. 9, 2010.

(51) Int. Cl.
*F16K 15/14* (2006.01)
*E03B 7/07* (2006.01)

(52) U.S. Cl.
USPC .......................................... 137/852; 137/549

(58) Field of Classification Search
USPC .................. 137/852, 549, 550, 529, 903, 535
See application file for complete search history.

(56) References Cited

U.S. PATENT DOCUMENTS

| | | | |
|---|---|---|---|
| 4,389,687 A | 6/1983 | Gorove | |
| 4,620,248 A | 10/1986 | Gitzendanner | |
| 4,957,518 A * | 9/1990 | Brassell | 96/4 |
| 5,417,743 A * | 5/1995 | Dauber | 96/13 |
| 5,454,157 A | 10/1995 | Ananth et al. | |
| 6,128,159 A * | 10/2000 | Ino | 360/97.16 |
| 6,205,845 B1 | 3/2001 | Dinsmore et al. | |
| 6,296,691 B1 * | 10/2001 | Gidumal | 96/17 |
| 6,317,286 B1 | 11/2001 | Murphy et al. | |
| 6,392,838 B1 | 5/2002 | Hearn et al. | |
| 6,560,064 B1 | 5/2003 | Hlrano | |
| 6,824,595 B2 * | 11/2004 | Ueki et al. | 96/134 |
| 6,831,811 B1 | 12/2004 | Andrikowich et al. | |
| 7,125,433 B2 * | 10/2006 | Garikipati et al. | 55/385.6 |
| 7,291,208 B2 * | 11/2007 | Dauber et al. | 96/134 |
| 7,306,659 B2 * | 12/2007 | Gorton et al. | 96/134 |
| 7,369,356 B2 * | 5/2008 | Iwase et al. | 360/97.17 |
| 2004/0168575 A1 * | 9/2004 | Isogawa et al. | 96/134 |
| 2007/0289971 A1 | 12/2007 | Olszewski | |
| 2008/0236397 A1 * | 10/2008 | Isogawa | 96/134 |
| 2009/0090245 A1 * | 4/2009 | Olszewski | 96/154 |
| 2009/0247970 A1 * | 10/2009 | Keleny et al. | 604/333 |

* cited by examiner

*Primary Examiner* — John Rivell
*Assistant Examiner* — David Colon Morales
(74) *Attorney, Agent, or Firm* — Pauly, Devries Smith & Deffner, LLC

(57) ABSTRACT

A one-way fill valve for use in electronic enclosures is disclosed. The one-way fill valve allows an inert gas to be added to an electronic enclosure without contamination and without excessive leakage. A scrim layer is provided between a breathable layer and a sealing element to protect the breathable layer from possible rupture and allow for greater air flow across the breathable layer.

11 Claims, 2 Drawing Sheets

VALVE FOR ELECTRONIC ENCLOSURE

This application claims the benefit of U.S. Provisional Application No. 61/421,536, filed Dec. 9, 2010, the contents of which are herein incorporated by reference.

FIELD OF THE INVENTION

The present invention is directed to a valve for an electronic enclosure. In particular, the invention is directed to valves for use in disk drives and similar devices.

BACKGROUND

Hard disk drives and other electronic equipment are often sealed within enclosures to provide a clean environment that is necessary for optimal operation of the equipment. For example, hard disk drives normally contain at least one inflexible platter or disk coated with magnetic material that is positioned within an enclosure. The disk is rapidly spun, and a magnetic read/write head "flies" a few nanometers above it in order to access or store data. The magnetic head rides on an air cushion, and it is desirable to position the head as close as possible to the disk without touching it in order to provide a high capacity drive.

Contaminants, including particles, gases, and liquids within the hard disk drive enclosure can act to reduce the efficiency and longevity of the hard drive. These contaminants can gradually damage the drive, cause deterioration in performance, and in certain situations even cause sudden, complete failure of the drive. Contaminants often enter the electronic enclosure from an external source, especially when the disk drive is subject to extreme environments, such as those used within portable music players. Common sources of contaminants in disk drives include leaks, which may or may not be intentional.

One particular concern regarding electronic enclosures is that contaminants from outside of the electronic enclosure should be prevented from entering the enclosure. These contaminants can be of particular significance because temperature fluctuations in the enclosure will often cause the exchange of air with the exterior environment. In recent years attention has been drawn to the possibility of sealing disk drive electronic enclosures so as to prevent the flow of gases into and out of the enclosure and further inclusion of an inert gas (such as helium) within the enclosure. However, filling an electronic enclosure with an inert gas can be difficult without inadvertently adding contaminating gases or without leakage of the inert gas out of the enclosure. Therefore, a need exists for improved methods and materials for controlling the flow of gases into and out of an electronic enclosure.

SUMMARY OF THE INVENTION

The present invention is directed to an assembly for use with an electronic enclosure, such as a hard disk drive enclosure containing a rotating disk. The present invention relates, in part, to a valve for an electronic enclosure or other controlled volume that is to be filled with an inert gas, such as helium. The valve can be used to provide a temporary seal preventing the escape of the inert gas from the enclosure. In one implementation, the valve is used to retain the inert gas while a more permanent seal is installed. For example, the valve can create a temporary seal while a more permanent seal, such a welded or glued cover, is installed over the top of temporary seals.

The invention is directed, in one implementation, to a one-way valve for use in an electronic enclosure. The valve comprises a substantially gas impermeable film and a porous film covering the gas impermeable film. The substantially gas impermeable film prevents the flow of gas in a first direction but readily allows the flow of gas in the opposite direction. In certain such implementations the gas impermeable film comprises PET, and in some implementations, the porous film comprises expanded polyethylene terepthalate (ePTFE). Typically the one-way valve further comprises an adhesive layer. A scrim layer is provided between a breathable layer and a sealing element to protect the breathable layer from possible rupture and allow for greater air flow across the breathable layer.

In some embodiments the one-way valve further comprises an elastomeric layer intermediate the substantially gas impermeable film and the porous film, and can include an adsorbent intermediate the substantially gas impermeable film and the porous film.

In some embodiments the substantially gas impermeable films comprise PET and the porous film comprises expanded polyethylene terepthalate. Generally the valve further comprises an adhesive layer for connecting the valve to a wall of an electronic enclosure. It will be appreciated that the valve can be constructed so as to be installed either on the interior or the exterior of the electronic enclosure. An elastomeric layer can be positioned intermediate the second substantially gas impermeable film and the porous film, the elastomeric layer helping to preserve the shape of the gas impermeable films and providing a force to close the valve when no pressure differential is present.

The above summary of the present invention is not intended to describe each discussed embodiment of the present invention. This is the purpose of the figures and the detailed description that follows.

FIGURES

The invention may be more completely understood in connection with the following drawings, in which.

Figure 6:
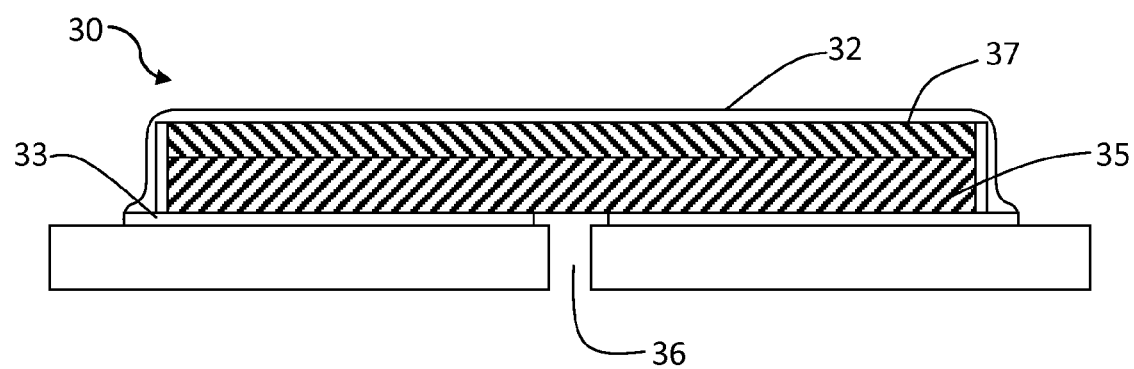

FIG. 6 a cross sectional view of an alternative fill valve made in accordance with an implementation of the invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The invention is directed, in one implementation, to a one-way valve for use in an electronic enclosure. The valve comprises a substantially gas impermeable film configured to move in a first direction and a porous film covering the gas impermeable film. The substantially gas impermeable film prevents the flow of gas in a first direction but readily allows the flow of gas in the opposite direction. In certain such implementations the gas impermeable film comprises polyethylene terephthalate (PET), although other films can be used, and in some implementations the porous film comprises expanded polyethylene terepthalate, although other films can be used.

Typically the one-way valve further comprises an adhesive layer. In some embodiments the one-way valve further comprises an elastomeric layer intermediate the substantially gas impermeable film and the porous film, and can include an adsorbent intermediate the substantially gas impermeable film and the porous film. A scrim layer is provided to protect the valve from possible rupture and allow for greater air flow.

In some embodiments the substantially gas impermeable films comprises PET and the porous film comprises expanded polyethylene terepthalate. Generally the valve further comprises an adhesive layer for connecting the valve to a wall of an electronic enclosure. An elastomeric layer can be positioned intermediate the second substantially gas impermeable film and the porous film, the elastomeric layer preserving the shape of the gas impermeable films and providing a force to close the valve when no pressure differential is present.

An alternative embodiment is directed to a valve for use in filling an electronic enclosure with an inert gas, the valve comprising a first substantially gas impermeable film having a first surface and a second surface. This first substantially impermeable film comprises a plurality of holes between the first surface and the second surface.

Referring now to the figures, an embodiment of the invention is described in detail with reference to the drawings, wherein like reference numbers represent like parts and assemblies throughout the several views. The terms "adsorb", "adsorbing", "adsorbent", and the like are to be understood to encompass both adsorption and absorption phenomena and materials.

FIGS. 1 to 5 show various views of a first embodiment of a valve 10 made in accordance with an implementation of the present invention. The valve 10 includes a top 12 and a bottom 14. The bottom 14 typically includes an adhesive material 13, which is often an adhesive sheet, such as an acrylic adhesive. However, any pressure sensitive adhesive can be used for the adhesive material 13. The interior (shown in FIG. 4) of the valve 10 comprises a movable sealing element 15, optionally made out of polyethylene terephthalate (PET); and a scrim layer 17. The sealing element 15 can be any film with release coating or low surface energy surface that can release from the adhesive material 13.

In some embodiments, the scrim layer 17 is a porous material such as polyethylene or polyester or polypropylene, which easily permits the passage of air. However, one having skill in the art will recognize that the scrim layer could be any scrim type material or scrim laminate. A breathable layer forming top 12 is typically a breathable membrane material, such as an expanded polytetrafluoroethylene film (PTFE) or another porous material. The edges of the breathable layer of the depicted embodiment are sealed together to the adhesive layer 13, such as by lamination so as to contain the sealing element 15 and scrim layer 17.

In embodiments where the scrim layer 17 is a porous material, air or other gases traveling through the valve can easily pass through the scrim layer 17, both in vertical and horizontal directions, depending on the amount of air pressure. This further facilitates air flow throughout the breathable layer 12, rather than just along the edges of the breathable layer 12. This reduces the pressure drop by helping to distribute air flow across the breathable layer 12.

In addition to providing for the passage of air or other gases traveling through the valve 10, the scrim layer 17 serves an additional purpose of acting as a buffer or protective layer between the sealing element 15 and the breathable layer 12. Commonly assigned application Ser. No. 11/746,636, U.S. Pat. No. 8,375,994, issued Feb. 19, 2013 titled "Valve for Electronic Enclosure," discloses a valve comprising a breathable layer, a sealing element, and an adhesive layer but no scrim layer. Continued use of the valve at high air flows and pressures can rupture the breathable layer 12, especially where potentially sharp edges of the sealing element 15 can make contact with the breathable layer 12, resulting in a broken valve. As such, the scrim layer 17 isolates the potentially sharp edges of the sealing element 15 from the breathable layer 12 to prevent the formation of ruptures in the breathable layer 12.

Figure 1:
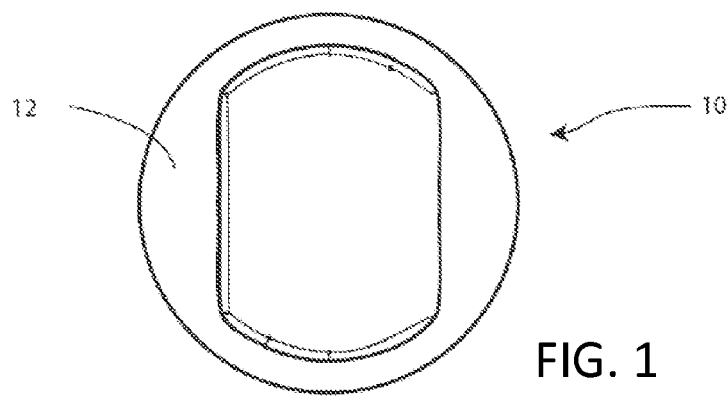
FIG. 1 is a top view of a fill valve in accordance with an embodiment of the invention.
Figure 2:
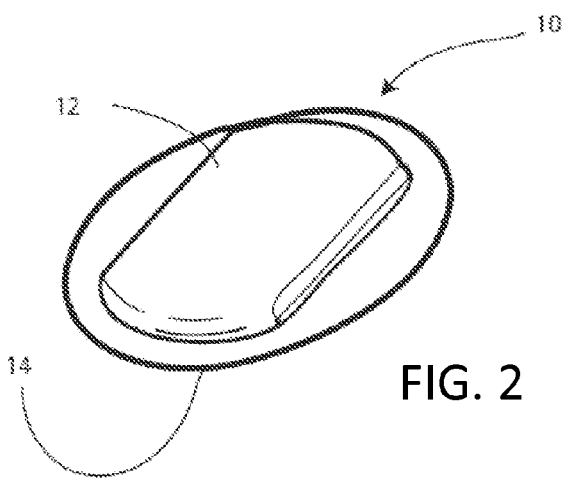
FIG. 2 is a perspective view of the fill valve of FIG. 1.
Figure 3:
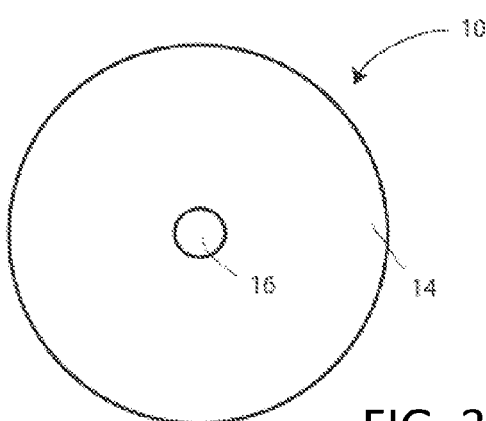
FIG. 3 is a bottom plan view of the fill valve of FIG. 1.
Figure 4:
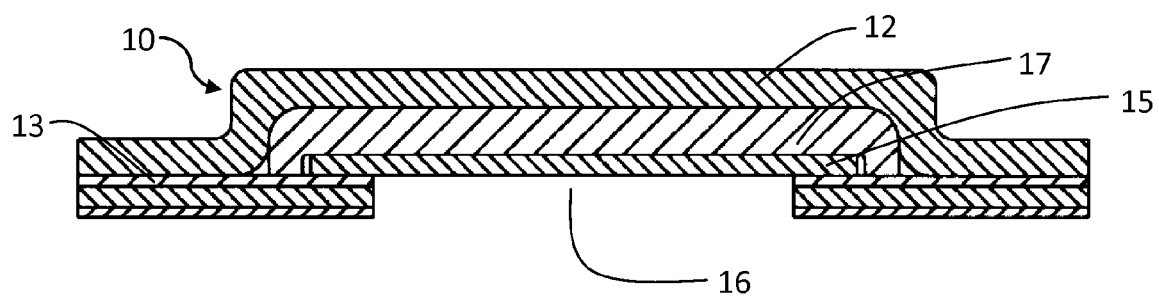
FIG. 4 is a cross-sectional view of the fill valve of FIG. 1.
Figure 5:
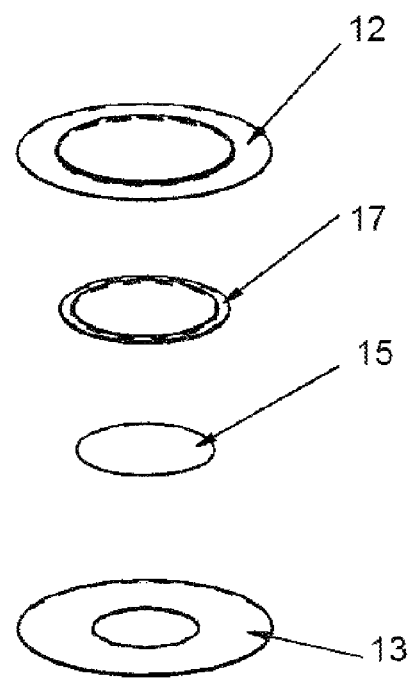
FIG. 5 is an exploded view of the fill valve of FIG. 1.

The diameter of the scrim layer 17 is generally larger than the diameter of the sealing element 15, so as to adequately isolate the sealing element 15 from the breathable layer 12, as shown in FIG. 4. Referring to FIG. 6, in some embodiments of the valve 30, the diameter of the scrim layer 37 is the same as the diameter of the sealing element 35. In that embodiment, the scrim layer 37 is cut to the same size as the sealing element 35. The scrim layer 37 may optionally be laminated to the sealing element 35.

Referring again to FIG. 5, valve 10 further includes an opening 16 in the bottom 14. The opening 16 allows air or other gases to travel through the valve in a direction proceeding from opening 16, around the sealing element 15 and scrim layer 17, and then through the breathable layer 12. In some embodiments, air or other gases first travel through the scrim layer 17 and then through the breathable layer 12.

In operation the valve 10 can be installed on the wall of an electronic enclosure (typically the interior of the enclosure) over a port or fill-hole in the enclosure. Gas is able to readily pass through the valve in a one-way direction from the bottom 14 toward the breathable layer 12 but does not readily pass in the opposite direction. Also, the gas is readily filtered by the breathable membrane material to remove any contaminants in the gas stream. In addition, one or more adsorbent layers can be included between the breathable layer 12 and the sealing element 13.

In a typical embodiment, when valve 10 is placed on the interior of an electronic enclosure a fill gas can pass through the valve 10 and enter the enclosure, but the fill gas does not readily escape from the enclosure. It will be noted that in some alternate implementations the valve 10 can be installed on the outside of an electronic enclosure so as to function as a purge valve that will allow excess gas out of the enclosure, but does not readily allow contaminants (such as a non-inert gas) back into the enclosure. In some implementations the fill valve 10 of the invention can be used for both applications.

Typically when an inert gas is being installed in an electronic enclosure a permanent seal is subsequently placed over the fill valve or valves. This is because many inert gases, especially helium, have molecules that are so small that an extremely tight seal must be formed. The valves of the present invention allow the purity of the gases within the electronic enclosure to be preserved until the permanent seal is installed over the top of the valves (such as, for example, by welding). Note, in many such implementations it is desirable to have an adsorbent within the fill valve or valves, because such adsorbent can remove any contaminants encapsulated by the permanent seal or generated by placement of the permanent seal (such as, for example, adhesive residue or welding byproducts). Adsorbent can prevent such contaminants from subsequently entering into the enclosure.

The assembly can also have additional layers or fewer layers, as desired, and the layers can be different on the top and bottom.

In the embodiments discussed above, the adhesive layer may be, for example, a coating of an adhesive material on the housing or a double-sided adhesive tape (e.g., an adhesive carrier, such as a polymer film, with adhesive coated on two opposing surfaces). An opening may be formed in the adhesive layer, particularly if the adhesive layer is a double-sided adhesive tape, to permit fluid flow into the inlet opening and/or to fit around the extension. When a release liner is used, it is typically a film, for example, a polymer film, which can be removed from the adhesive layer leaving most, and, preferably, all, of the adhesive layer disposed on the housing. The release liner may extend beyond the adhesive layer to allow for easy removal.

In some embodiments each assembly contains at least one particulate removal or filtration layer. The particulate removal layer can include, for example, electrostatic filter media. In certain embodiments a polymeric scrim may surround the adsorbent elements and function as the particulate filter. However, in general the polymeric scrim is used in addition to the particulate filter, such as the electrostatic filter media. The particulate removal layer typically includes a porous polymer film made from, for example, polyethylene, polypropylene, polytetrafluoroethylene, modacrylic, or expanded polytetrafluoroethylene. The particulate removal layer generally prevents particulate material from entering or exiting the interior of the electronic enclosure. The particulate removal layer can be made of any material commonly available for particulate filtration, and can have any thickness that provides suitable air flow values and particulate removal. Preferably, the thickness of each layer is normally between about 0.1 to 5 mm, more typically between about 0.15 to 1.0 mm, and can be between about 0.20 to 0.25 mm. In a preferred embodiment, the total thickness of the valve 10 does not exceed 0.9 mm. However, in other embodiments, the valve 10 may be more than 0.9 mm in total thickness.

Advantageous particulate removal layers include those made of an electrostatic medium, or a polymer medium such as Teflon. A suitable electrostatic medium, for example, is a mixed fiber medium of 50% polypropylene and 50% modacrylic that exhibits a permanent electrical potential, having a Fomblin Efficiency of 76-94% average with no single value below 71 or above 99 (test at 10.5 ft./min. airflow, 0.3-0.4 micron particles); permeability of 200-476 ft./min.; thickness of 0.036-0.061 inches; and basis weight equivalent to 30-150 gm/m$^2$ (48-75 lbs./3000 ft$^2$). An exemplary polymer medium is a Teflon fibrous membrane filter medium having a Fomblin Efficiency of 98.0% minimum (challenge solution is 50% Fomblin in Freon); a Frazier Permeability of 15.0 ft./min minimum average (all readings greater than 11.0 ft./min.); and a tensile strength of less than 7000 psi average over 5 samples.

As noted above in some implementations the assembly includes an adsorptive element, typically a chemical adsorptive material containing carbon. Thus, at least a portion of the material can have adsorbent properties. The adsorbent material can include physisorbents and/or chemisorbents, such as desiccants (i.e., materials that adsorb or absorb water or water vapor) and/or materials that adsorb volatile organic compounds and/or acid gas. Acid gases can be generated inside an electronic enclosure, thus it is desirable to include an organic vapor removal layer impregnated with a chemical which provides enhanced acid gas removal. Exemplary chemicals which can be used to evaluate an impregnants ability to remove acid gas include hydrogen sulfide ($H_2S$), hydrochloric acid (HCl), chlorine gas ($Cl_2$), and the like.

Suitable adsorptive materials include, for example, activated carbon, activated alumina, molecular sieves, silica gel, potassium permanganate, calcium carbonate, potassium carbonate, sodium carbonate, calcium sulfate, or mixtures thereof. The adsorbent material may adsorb one or more types of contaminants, including, for example, water, water vapor, acid gas, and volatile organic compounds. Although the adsorbent material may be a single material, mixtures of materials are also useful. For typical operation, an adsorbent material that is stable and adsorbs within a temperature range of −40° C. to 100° C. is preferred.

It will be appreciated that, although the implementation of the invention described above is directed to a hard drive enclosure, the present device may be used with other electronic enclosures, and is not limited to hard drive enclosures. In addition, while the present invention has been described with reference to several particular implementations, those skilled in the art will recognize that many changes may be made hereto without departing from the spirit and scope of the present invention.

I claim:

1. A one-way valve for use in an electronic enclosure, the valve comprising:
   a breathable top face comprising a porous film;
   a bottom face comprising an adhesive material;
   a movable sealing element; and
   a scrim layer positioned intermediate the sealing element and breathable top face;
   wherein the sealing element comprises a film that is releasably secured to the adhesive material.

2. The one-way valve for use in an electronic enclosure of claim 1, wherein the sealing element further comprises a release coating.

3. The one-way valve of claim 1, wherein the porous film comprises expanded polyethylene terepthalate.

4. The one-way valve of claim 1, further comprising an adhesive layer.

5. The one-way valve of claim 1, further comprising an elastomeric layer intermediate the sealing element and breathable top face.

6. The one-way valve of claim 1, further comprising an adsorbent intermediate the sealing element and breathable top face.

7. A fill valve for use in filling an electronic enclosure with an inert gas, the valve comprising:
   a porous film;
   an adhesive material;
   a movable sealing element;
   a bottom surface; and
   a scrim layer positioned intermediate the sealing layer and breathable top face, wherein the adhesive material is disposed between the bottom surface and the sealing element and the adhesive material is in contact with the sealing element.

8. The fill valve of claim 7, wherein the porous film comprises expanded polyethylene terepthalate.

9. The fill valve of claim 7, further comprising an adhesive layer for connecting the valve to a wall of an electronic enclosure.

10. The fill valve of claim 7, further comprising an elastomeric layer.

11. The fill valve of claim 7, further comprising an adsorbent.

* * * * *